(12) United States Patent
Takeuchi

(10) Patent No.: US 7,156,990 B2
(45) Date of Patent: Jan. 2, 2007

(54) COAGULATION-FLOCCULATION APPARATUS

(75) Inventor: Tadao Takeuchi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 11/116,377

(22) Filed: Apr. 28, 2005

(65) Prior Publication Data

US 2005/0189280 A1     Sep. 1, 2005

Related U.S. Application Data

(63) Continuation of application No. PCT/JP03/13997, filed on Oct. 31, 2003.

(30) Foreign Application Priority Data

Nov. 13, 2002 (JP) .............................. 2002-329162

(51) Int. Cl.
  *C02F 1/52*   (2006.01)
(52) U.S. Cl. ................. 210/205; 366/165.3; 366/176.1
(58) Field of Classification Search ................ 210/205, 210/207, 208, 738, 198.1; 366/163.2, 165.1, 366/165.3, 336, 176.1

See application file for complete search history.

(56) References Cited

U.S. PATENT DOCUMENTS 3,300,047 A * 1/1967 Hirsch ........................ 210/197
4,372,851 A   2/1983 Mandt
4,394,270 A * 7/1983 Hartmann et al. .......... 210/726
5,120,436 A   6/1992 Reichner

FOREIGN PATENT DOCUMENTS

| JP | 59186690 A | * | 10/1984 |
| JP | 03080902 A | * | 4/1991 |
| JP | 08-961 | | 1/1996 |
| JP | 2965582 | | 8/1999 |

* cited by examiner

*Primary Examiner*—Matthew O. Savage
(74) *Attorney, Agent, or Firm*—Manabu Kanesaka

(57) ABSTRACT

A coagulation-flocculation apparatus for conducting coagulation-flocculation treatment by adding a coagulant or flocculent to suspension such as sludge is capable of diffusing the flocculant into the suspension uniformly so as to exhibit flocculation function of the flocculant effectively, thereby enhancing the flocculation efficiency, shortening the processing time, and allowing reduction in size of the apparatus. The flocculation apparatus has transfer piping 12 for transferring suspension, small-diameter piping 13 of which diameter is smaller than that of the transfer piping 12 and which is connected to the transfer piping 12, a flocculent supplying device disposed on the small-diameter piping 13 or the transfer piping 12 on the upstream side thereof, and a temporary retention section 11 for flocculation having an inlet and an outlet for water, the small-diameter piping 13 being connected to the inlet. The cross-sectional area of flow path at at least a part of the temporary retention section 11 in the direction from the inlet toward the outlet is larger than the cross-sectional area of the transfer piping 12.

8 Claims, 7 Drawing Sheets

Raw sludge →

Polymer flocculant

Raw sludge →

Polymer flocculant

COAGULATION-FLOCCULATION APPARATUS

CROSS REFERENCE TO RELATED APPLICATION

This is a continuation application of PCT/JP03/13997 filed on Oct. 31, 2003.

FIELD OF THE INVENTION

The present invention relates to a coagulation-flocculation apparatus for treating by coagulation-flocculation an aqueous suspension such as excess sludge discharged from biological treatment process of organic waste water including sewage water and, particularly, to a coagulation-flocculation apparatus capable of improving coagulation-flocculation efficiency and allowing the apparatus to be made compact.

BACKGROUND OF THE INVENTION

To dewater sludge such as excess sludge discharged from biological treatment process of organic waste water including sewage water, coagulation-flocculation treatment is conducted by adding a polymer flocculant into the sludge to form flocs and dewatering treatment is then conducted. In the coagulation-flocculation treatment, in order to form tough flocs so as to improve dewatering efficiency, an amphoteric polymer flocculant may be added after an inorganic coagulant such as polyferric sulphate is added to neutralize charge of the sludge.

FIG. 7a is a schematic sectional view showing a conventional flocculation reaction apparatus for flocculation treatment by adding a polymer flocculant to sludge (raw sludge). The raw sludge is introduced by a sludge pump P into a flocculation reaction tank 1 where the polymer flocculant is added to the raw sludge. The polymer flocculant and the raw sludge are agitated and mixed by an agitator 1M and the flocculated sludge is discharged. The polymer flocculant may be injected at an introducing piping of the raw sludge.

FIG. 7b is a schematic sectional view showing a conventional coagulation-flocculation reaction apparatus for coagulation-flocculation treatment by adding an inorganic coagulant and an amphoteric polymer flocculant to raw sludge. The raw sludge is introduced by a pump P into a first reaction tank 2 where the inorganic coagulant is added to the raw sludge. The inorganic coagulant and the raw sludge are agitated and mixed by a mixer 2M and the mixture is then introduced into a second reaction tank 3 where the amphoteric polymer flocculant is added to the mixture. The amphoteric polymer flocculant and the mixture are agitated and mixed by a mixer 3M and the flocculated sludge is discharged.

In the flocculation treatment by adding a polymer flocculant to sludge, slow agitation is required because flocs are broken into small flocs by strong agitation. However, since liquid solution of the polymer flocculant has high viscosity, it is difficult to uniformly diffuse the flocculant into the sludge by the slow agitation. In case of employing the slow agitation for the purpose of preventing the flocs from being broken into small flocs, it takes a long time to diffuse the polymer flocculant and it causes irregularity in adhesion of the polymer flocculant on the surface of sludge so that sufficient flocculation function can not be obtained. As a result, it is required to increase the adding amount of the polymer flocculant. Though rapid agitation is preferable for uniformly diffuse the polymer flocculant, the rapid agitation makes flocs into small flocs so that it is impossible to grow flocs.

Strong agitation is required also for achieving effective reaction of the sludge with the inorganic coagulant. In this case, unlike the flocculation treatment by the polymer flocculant, it does not matter if flocs are broken into small flocs. However, too much power is consumed for the agitation. Further, in case of raw sludge containing foreign substance such as mixed crude sludge of sewage water, agitation blades may be clung thereto with foreign substances so that smooth agitation may be disturbed.

Japanese Utility Model Publication H08-961B discloses a flocculation reaction apparatus which is provided with a line mixer for promoting reaction of sludge with a polymer flocculant. In the flocculation reaction apparatus, agitation blades of the line mixer is clung thereto with foreign substances in the sludge so that piping may be clogged with time.

Normally, piping is designed to have a large diameter not to increase pressure loss in order to lower the discharge pressure of a pump. In such piping, aqueous suspension flows in laminar flow so that agitation effect can not be obtained.

Japanese Patent No. 2965582 discloses a flocculation reaction apparatus in which a reduced-diameter portion is formed on the way of sludge piping, thereby achieving uniform diffusion of flocculant by turbulent flow in the reduced-diameter portion. However, uniform diffusion of flocculant by forming the reduced-diameter portion on the sludge piping is insufficient. In case of using a polymer flocculant, a certain amount of processing time is required to form flocs. Enough processing time can not be taken only by forming the reduced-diameter portion on the way of the sludge piping. Therefore, preferable flocs are not formed.

SUMMARY OF THE INVENTION

It is an object of the present invention to solve problems mentioned above, to provide a flocculation reaction apparatus for coagulation-flocculation treatment by adding a coagulant or flocculant into aqueous suspension, for example, of sludge, which achieves uniform diffusion of the coagulant or flocculant so as to improve the coagulation-flocculation efficiency, shorten the processing time, and allow reduction in size of the apparatus.

A coagulation-flocculation reaction apparatus of the present invention has transfer piping for transferring suspension water; small-diameter piping having a diameter smaller than that of the transfer piping and being connected to the transfer piping; a coagulant or flocculant supply device provided to the small-diameter piping or the transfer piping in the upstream of the small-diameter piping; and a temporary retention section for coagulation-flocculation reaction having an inlet and an outlet for water. The small-diameter piping is connected to the inlet. A cross-sectional area of flow path at at least a part of the temporary retention section in the direction from the inlet toward the outlet is larger than the cross-sectional area of said transfer piping.

In the apparatus of the present invention, since the flow of suspension water becomes turbulent flow in the small-diameter piping of which diameter is smaller than that of the transfer piping, the coagulant or flocculent injected at the small-diameter piping or a portion on the upstream side thereof is effectively uniformly diffused into the suspension water in the small-diameter piping. Since the small-diameter piping is connected to the temporary retention section, the coagulant or flocculant is uniformly diffused into the suspension water in the small-diameter piping whereby the suspension water is promoted its coagulation-flocculation in the temporary retention section.

When the flocculant is a polymer flocculant, the polymer flocculant added to the suspension water is uniformly diffused while the water flows in the small-diameter piping so that the polymer flocculant adheres to the surface of sludge (SS), whereby flocs are grown larger in the temporary retention section on the downstream side of the small-diameter piping.

When the coagulant is an inorganic coagulant, the inorganic coagulant is rapidly and uniformly agitated in the small-diameter piping and the diffusion and reaction of the inorganic coagulant are further promoted in the temporary retention section on the downstream side of the small-diameter piping.

The inventor of the present invention has found that the reaction by adding an inorganic coagulant for neutralizing negative charges on the surface of sludge (SS) progresses very rapidly on the second time scale. In the reaction, it is not necessary to neutralize the entire amount of charges on the surface of sludge so that it is enough to neutralize about 50% or more of charges. The inventor found that it is enough to add such an amount of an inorganic coagulant just for conducting this neutralization and to agitate and mix the inorganic coagulant and sludge. If the agitation force for mixing the sludge and the inorganic coagulant is enough strong to diffuse the inorganic coagulant uniformly, average 50% of charges on the surface of sludge can be neutralized. However, if the agitation force is weak so that the inorganic coagulant can not be diffused enough, some parts of charges can not be neutralized well while some other parts can be neutralized so that the strength of flocs to be formed by adding a polymer flocculant thereafter becomes weak.

In the coagulation-flocculation apparatus of the present invention, rapid uniform diffusion of inorganic coagulant into suspension water is achieved in the small-diameter piping and is further promoted in the temporary retention section so that strong flocs can be formed by adding a polymer flocculant thereafter.

The combination of the small-diameter piping and the temporary retention section on the downstream side thereof to which the small-diameter piping is connected is very important in the present invention. The rapid agitation action by turbulent flow in the small-diameter piping, the mixing and diffusion action by high-speed jet flow from the small-diameter piping into the temporary retention section, and the uniform mixing action in the temporary retention section cooperate together to achieve excellent flocculation treatment.

However, in case of no temporary retention section, concentration difference in flocculant may be caused because the injection amount of coagulant or flocculant may vary due to pulsation of an injection pump for coagulant or flocculent. On the other hand, to conduct the coagulation or flocculation treatment only by a small-diameter piping, a long small-diameter piping is required for ensuring reaction time. This case is also not preferable because pressure loss is increased, involving a necessity of increasing the discharge pressure of the pump. In addition, when the downstream portion of-the small-diameter piping is piping of which diameter is substantially the same as the transfer piping, the flow in the piping becomes laminar flow so that well mixing effect can not be obtained.

In the present invention, the temporary retention section may be piping of which diameter is larger than that of the transfer piping. The temporary retention section may be a cylindrical vessel and the small-diameter piping is connected substantially tangentially to the cylindrical vessel so as to generate circling flow in the cylindrical vessel. In this case, excellent mixing and diffusion effect can be obtained by the circling flow in the cylindrical vessel.

The temporary retention section may be provided with a mixer. Especially for growing flocs large by the polymer flocculant, the sludge is subjected to slow agitation by the mixer after rapid mixing at the small-diameter piping and at a spouted flow portion from the small-diameter piping to the temporary retention section, thereby obtaining excellent flocculation treatment effect.

Further in the coagulation-flocculation reaction apparatus of the present invention, an agitation reaction tank having a mixer may be arranged downstream of the temporary retention section.

PREFERRED EMBODIMENTS OF THE INVENTION

Hereinafter, preferred embodiments of a coagulation-flocculation apparatus of the present invention will be described in detail with reference to the attached drawings.

First, a flocculation reaction apparatus of the present invention which is suitable for flocculation treatment using a polymer flocculant will be described with reference to FIGS. 1(a) through 3(b).

Figure 1A:
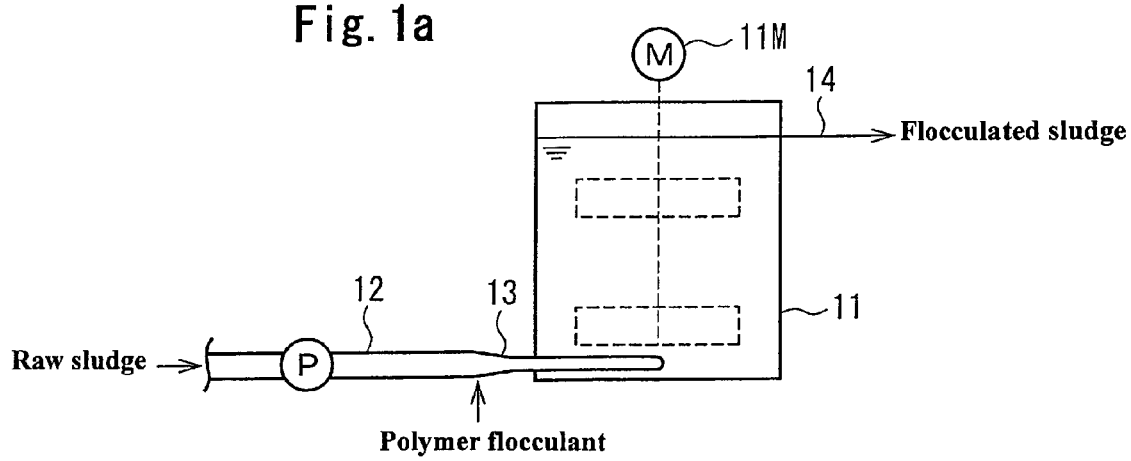
FIG. 1a is a schematic front view showing an embodiment of a coagulation-flocculation apparatus of the present invention.
Figure 1B:
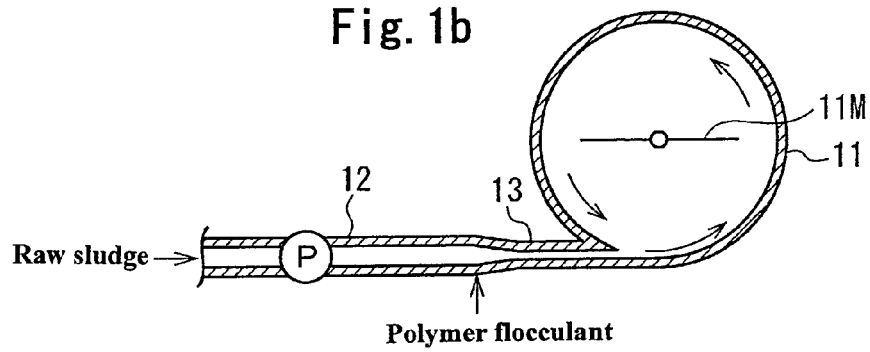
FIG. 1b is a sectional view of the same.
Figure 1C:
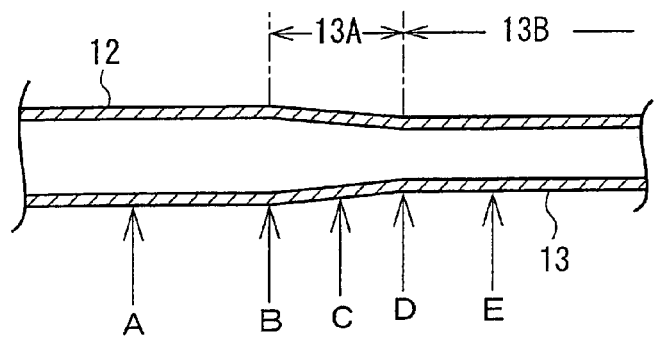
FIG. 1c is an enlarged sectional view of a piping section of the same.
Figure 2A:
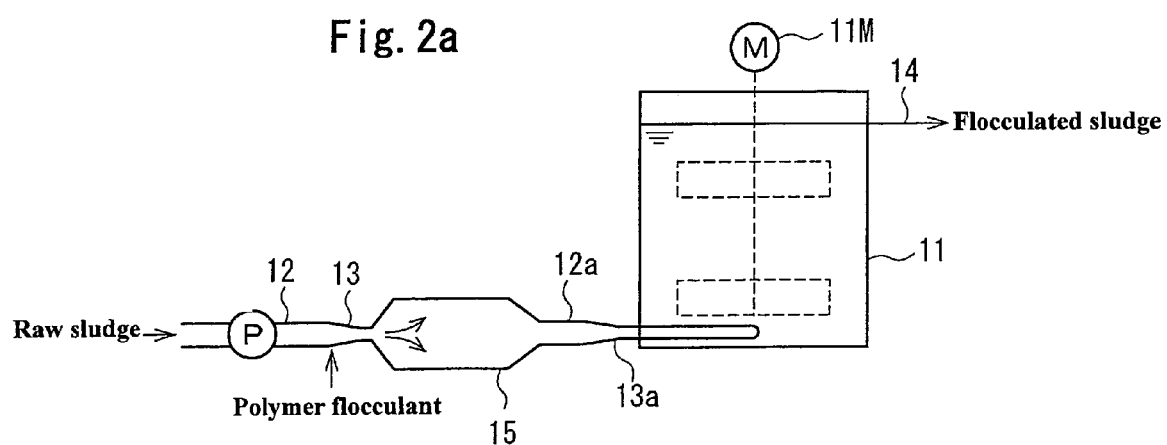
FIG. 2a is a schematic front view showing another embodiment of a coagulation-flocculation apparatus of the present invention and FIG. 2b is a sectional view of the same.
Figure 2B:
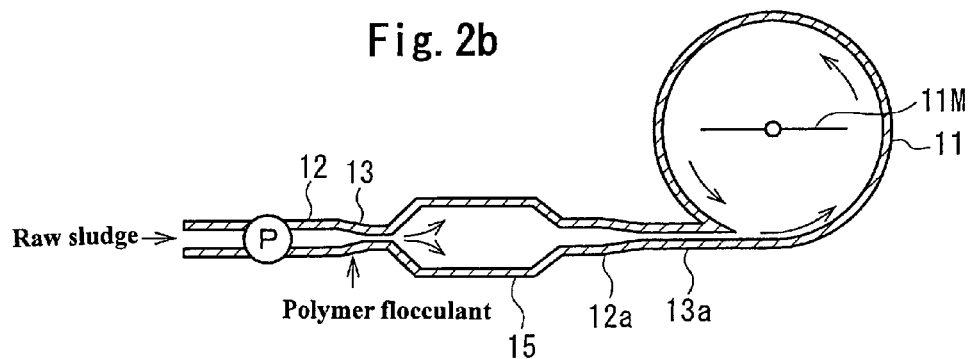
Figure 3A:
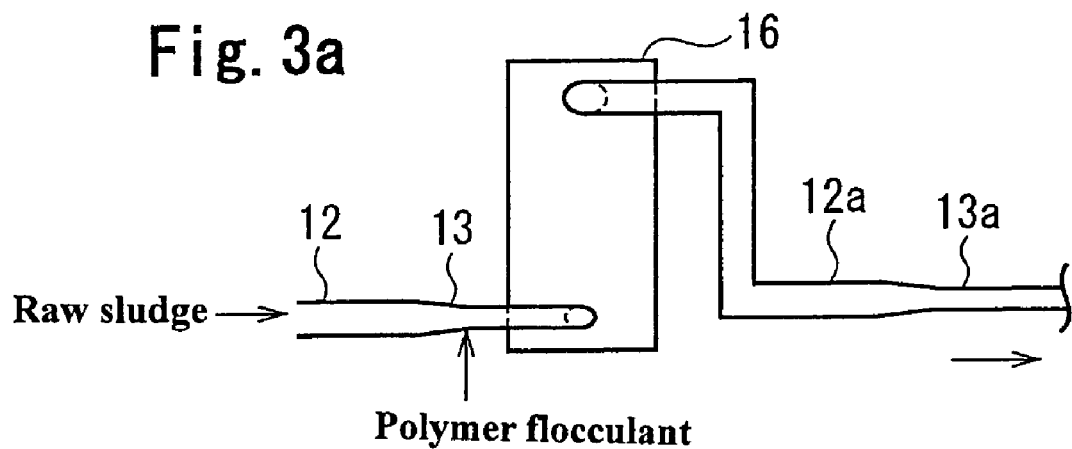
FIG. 3a is a schematic front view showing another embodiment of an apparatus of the present invention and FIG. 3b is a plan view of the same.
Figure 3B:
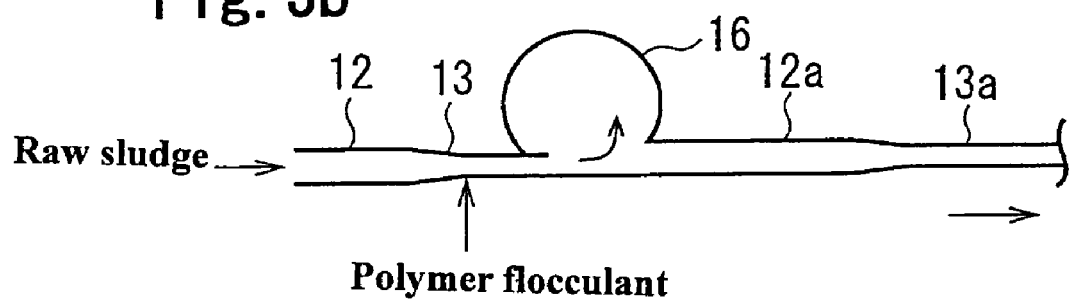

FIGS. 1a through 3b show embodiments of a flocculation reaction apparatus which is suitable for flocculation treatment using a polymer flocculant. FIGS. 1a, 2a are schematic front views and FIGS. 1b, 2b are schematic sectional views. FIG. 1c is an enlarged sectional view showing a piping section. FIG. 3a is a schematic front view and FIG. 3b is a plan view of the same.

A flocculation reaction apparatus shown in FIGS. 1a, 1b, 1c has a flocculation tank 11, transfer piping 12 having a raw sludge pump P for transferring sludge (raw sludge) to the tank 11, and small-diameter piping 13 of which diameter is smaller than that of the transfer piping 12. One end of the piping 13 is connected to the transfer piping 12 and the other is connected to the tank 11. A polymer flocculant is injected at or near a joint between the transfer piping 12 and the small-diameter piping 13. The tank 11 is provided with an agitator 11 M. The small-diameter piping 13 is connected substantially tangentially to the cylindrical vessel-like tank 11.

After the sludge is added with the polymer flocculant as described above, the raw sludge is introduced to the tank 11 from the small-diameter piping 13. The polymer flocculant is uniformly dispersed in the sludge by turbulent flow in the small-diameter piping 13. When the sludge is spouted from the small-diameter piping 13 into the tank 11 at a high velocity, the polymer flocculant is further diffused. The sludge flows into the tank 11 tangentially from the small-diameter piping 13 and flows around therein, and the polymer flocculant is diffused further more uniformly, since the flocculant is mixed with sludge in the tank 11. While the sludge containing the polymer flocculant uniformly therein circles slowly in the tank 11, flocs are grown, thereby exhibiting excellent flocculation treatment effect. The flocculated sludge obtained in the tank 11 is discharged through a piping 14 and is transferred to a dewatering process.

The tank 11 functions as a temporary retention section in the flocculation reaction apparatus shown in FIGS. 1a, 1b, 1c. A flocculation apparatus shown in FIGS. 2a, 2b is different from the above embodiment in that a large-diameter piping section 15 functioning as a temporary retention section is disposed in the upstream of the tank 11. Other structure of this embodiment is the same as that of the above embodiment.

In the flocculation apparatus of FIGS. 2a, 2b, a polymer flocculant injected at the joint between the transfer piping 12 and the small-diameter piping 13 is uniformly mixed with and diff-used into sludge by turbulent flow in the small-diameter piping 13 in the same manner as the flocculation reaction apparatus of FIGS. 1a, 1b, and 1c. After that, the sludge is spouted from the small-diameter piping 13 into the large-diameter piping section 15 and flows therein, thereby further promoting the mixing and diffusion of the polymer flocculant. The sludge is introduced from the large-diameter piping section 15 into the tank 11 tangentially and flows around therein to be agitated slowly, so that the polymer flocculant is further uniformly diffused and flocs are grown large. Then, the flocculated sludge is discharged through the piping 14. In the flocculation reaction apparatus of FIGS. 2a, 2b, the transfer piping from the large-diameter piping section 15 to the tank 11 consists of transfer piping 12a and 13a. The piping 12a has a diameter substantially equal to the piping 12, and the small-diameter piping 13a has a diameter substantially equal to that of the piping 13. Therefore, the diffusion of the polymer flocculant is promoted by turbulent flow in the small-diameter piping 13a while being transferred from the large-diameter piping section 15 to the tank 11.

The temporary retention section upstream of the tank 11 is not limited to the large-diameter piping section as shown in FIGS. 2a, 2b and may be a cylindrical vessel-like reaction tank.

FIGS. 3a, 3b are illustrations showing a cylindrical vessel-like retention tank 16 as the temporary retention section upstream of the tank 11. Members exhibiting the same functions as those in FIGS. 2a, 2b are designated by the same numerals. It should be noted that the illustration of a subsequent flocculation reaction tank is omitted.

In case of using such a retention tank 16, small-diameter piping 13 is preferably connected tangentially to the retention tank 16. The sludge flows around the retention tank 16, thereby obtaining excellent agitation and mixing action.

In the flocculation apparatus of FIGS. 3a, 3b, a polymer flocculent injected at the joint between transfer piping 12 and the small-diameter piping 13 is uniformly mixed with and diff-used into sludge by turbulent flow in the small-diameter piping 13 in the same manner as the flocculation reaction apparatus of FIGS. 2a, 2b. After that, the sludge is spouted from the small-diameter piping 13 into a lower portion of the retention tank 16, where the sludge circles and flows upward, thereby further promoting the mixing and diffusion of the polymer flocculant. The polymer flocculent is further uniformly diffused in the small-diameter piping 13a while the sludge out of the retention tank 16 passes through the transfer piping 12a and the small-diameter piping 13a. Then, the sludge flows into the tank 11 (not shown) tangentially and agitated slowly, so that the polymer flocculent is further uniformly diffused and flocs are grown thereby obtaining excellent flocculated sludge.

FIGS. 1a through 3b show embodiments of the flocculation apparatus of the present invention of a type using a polymer flocculant as the flocculent. When a polymer flocculant is used as the flocculent, an agitation tank is required for making flocs to grow large. The agitation tank may also function as a temporary retention section as shown in FIGS. 1a, 1b and may be provided subsequently to the temporary retention section as shown in FIGS. 2a through 3b.

In either case, the polymer flocculent adheres uniformly to the surface of sludge in a short time by rapid mixing in the small-diameter piping, and the sludge having the polymer flocculant thereon is subjected to slow agitation in the agitation tank, thereby obtaining excellent flocculated sludge.

As described above, rapid mixing for uniformly diffusing the polymer flocculant is conducted in the small-diameter piping and further in the temporary retention section between the small-diameter piping and the agitation tank prior to the slow agitation for making flocs large, thereby substantially reducing the retention time in the flocculation reaction tank as the agitation tank. As a result, the capacity of the flocculation reaction tank can be reduced so as to make the apparatus compact. The uniform diffusion of polymer flocculant enables the injected polymer flocculant to act effectively on flocculation of sludge, thus allowing reduction in required amount of the polymer flocculant.

As the sludge flows into the flocculation reaction tank along the tangential direction which is the same direction of the circling flow caused by agitation blades provided in the tank, the sludge flows smoothly and uniformly agitated without causing turbulent in the tank so as to promote growth of flocs. This allows reduction in power for agitation.

In case of flocculation treatment by a polymer flocculant, the flocculation reaction apparatus of the present invention with the small-diameter piping, the retention time in the tank 11 is about 0.5 to 3 minutes which is significantly reduced as compared to about 3 to 10 minutes in the prior art.

When a large-diameter piping section 15 or a retention tank 16 is provided as a temporary retention section upstream of the flocculation reaction tank as shown in FIGS. 2a through 3b, uniform diffusion is conducted at the small-diameter piping, the temporary retention section, and the flocculation reaction tank. Therefore, very short time is enough for retention in the temporary retention section. For example, in case of the large-diameter piping section 15 of FIGS. 2a, 2b, the retention time may be about 0.5 to 5.0 seconds. In case of the retention tank 16 of FIGS. 3a, 3b, the retention time may be about 1 to 10 seconds. Therefore, the diameter and length of the large-diameter piping section 15 or the diameter and height of the retention tank 16 are designed in such a manner as to ensure such retention time.

In each of the flocculation reaction apparatuses of FIGS. 2a through 3b, the piping from the large-diameter piping section 15 or the retention tank 16 as the temporary retention section to the tank 11 may have the same diameter as the normal transfer piping or the same diameter as the small-diameter piping. Though the small-diameter piping further increases the uniform diffusion effect, there is a risk of increase in pressure loss and/or blockage in piping due to foreign substances if the small-diameter piping section is too long. Accordingly, the combination of the transfer piping 12a and the small-diameter piping 13a as shown in FIGS. 2a through 3b is preferable.

Hereinafter, a flocculation reaction apparatus of the present invention suitable for the case using an inorganic coagulant and a polymer flocculant as the flocculant will be described with reference to FIGS. 4 through 6.

Figure 4:
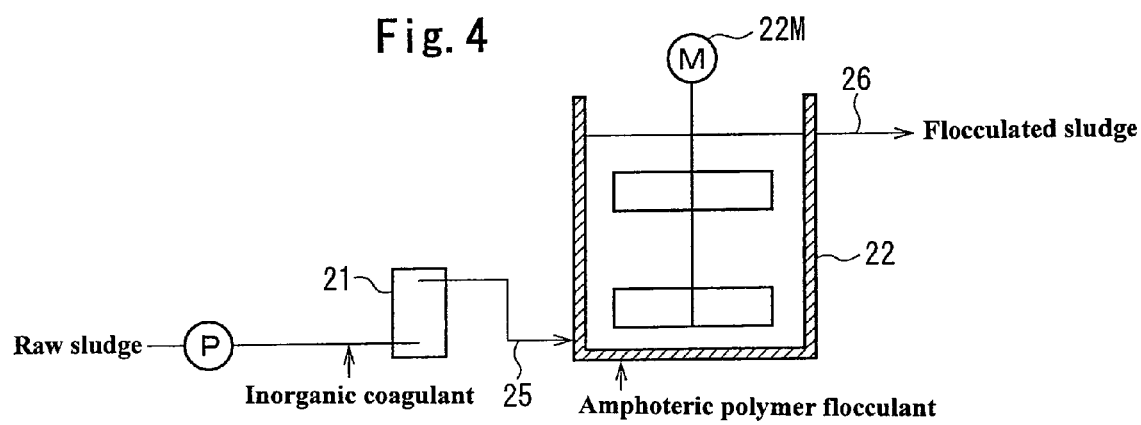
FIG. 4 is a schematic sectional view showing another embodiment of an apparatus of the present invention.
Figure 5A:
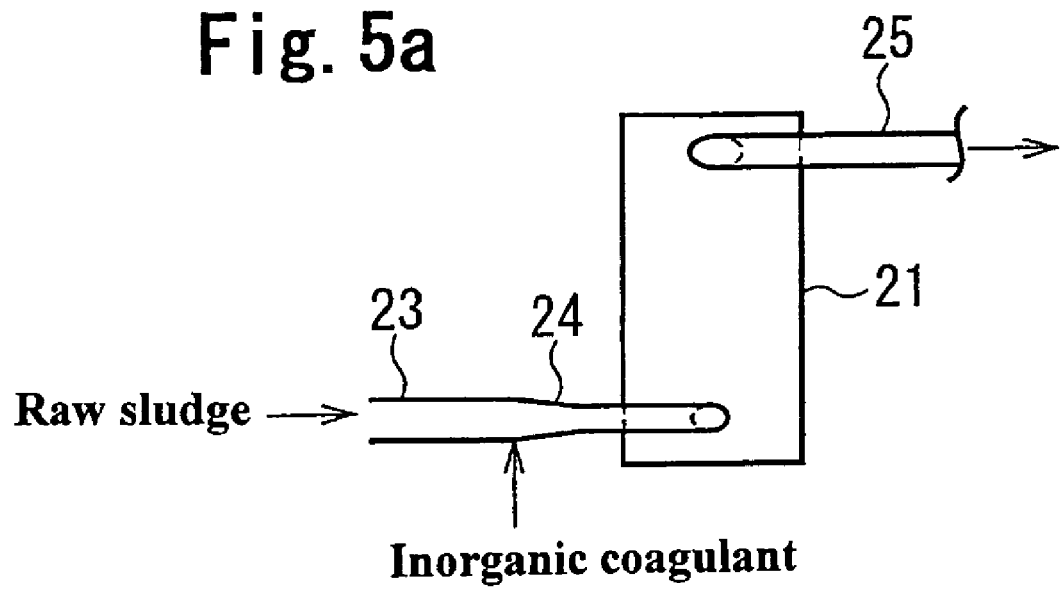
FIG. 5a is a schematic front view showing a retention tank section of the apparatus shown in FIG. 4
Figure 5B:
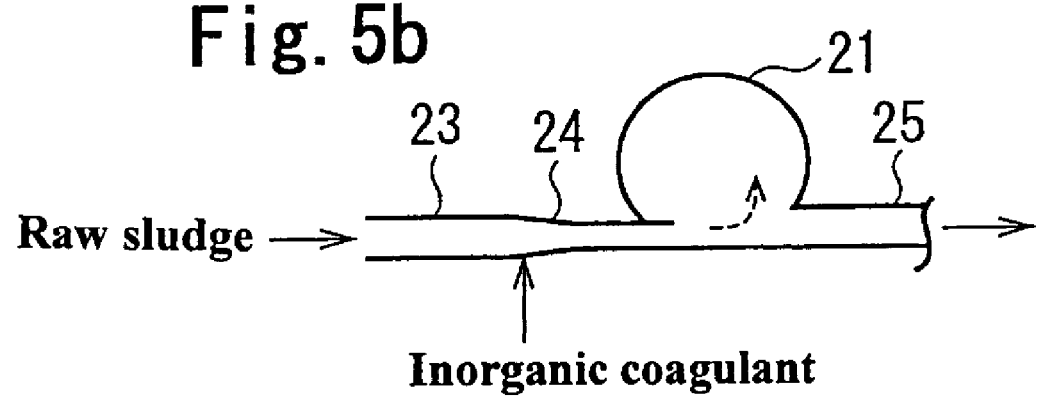
FIG. 5b is a plan view of the same.
Figure 6:
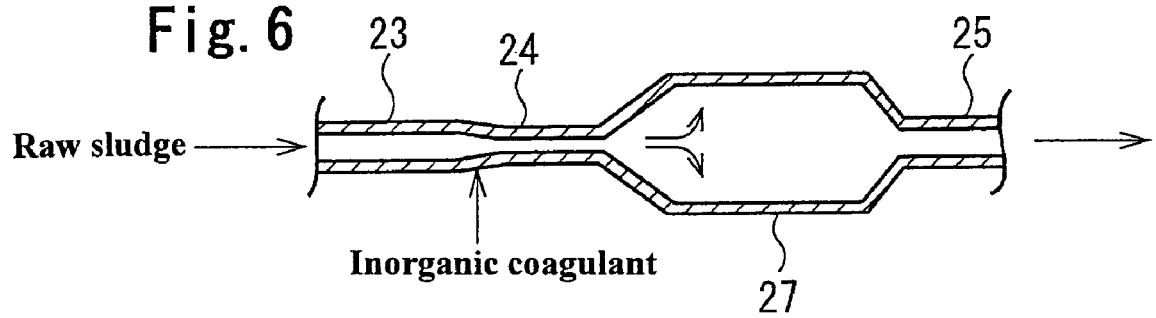
FIG. 6 is a schematic sectional view showing another example of a temporary retention section.

FIGS. 4 through 6 are illustrations showing embodiments of the coagulation-flocculation apparatus of the present invention which is suitable for coagulation-flocculation treatment by an inorganic coagulant and a polymer flocculant. FIG. 4 is a schematic sectional view of a coagulation-flocculation apparatus, FIG. 5a is a schematic front view showing a retention tank section of the coagulation-flocculation apparatus of FIG. 4, and FIG. 5b is a plan view of the same. FIG. 6 is a schematic sectional view of another embodiment of a temporary retention section.

A coagulation-flocculation reaction apparatus shown in FIG. 4 has a retention tank 21 as the temporary retention section and a flocculation tank 22, wherein raw sludge discharged from a sludge pump P is introduced into the flocculation tank 22 through the retention tank 21 after an inorganic coagulant is injected at an inlet side of the retention tank 21. Flocculation treatment is further conducted by an amphoteric polymer flocculant injected into the flocculation tank 22.

As shown in FIGS. 5a, 5b, small-diameter piping 24 is connected to transfer piping 23 having a raw sludge pump and the small-diameter piping 24 is connected to the retention tank 21, the diameter of the small-diameter piping 24 being smaller than the transfer piping 23. The inorganic coagulant is injected at or near the joint between the transfer piping 23 and the small-diameter piping 24. The small-diameter piping 24 is connected substantially tangentially to the cylindrical vessel-like retention tank 21.

After the inorganic coagulant is injected at or near the joint between the transfer piping 23 and the small-diameter piping 24, the raw sludge is introduced to the retention tank 21. The inorganic coagulant is uniformly diffused and mixed with the sludge by turbulent flow in the small-diameter piping 24. As the sludge is spouted at a high velocity from the small-diameter piping 24 into the retention tank 21, the mixing and diffusion of the inorganic coagulant are further promoted. The sludge flowing tangentially into the retention tank 21 from the small-diameter piping 24 flows around or circles in the retention tank 21 so that the inorganic coagulant is further mixed with the sludge in the retention tank 21. Therefore, the inorganic coagulant is further uniformly mixed and diffused.

The sludge in which the inorganic coagulant is mixed and diffused as mentioned above is transferred to the flocculation tank 22 through piping 25. The amphoteric polymer flocculant is added to the flocculation tank 22. The sludge and the amphoteric polymer flocculant are subjected to slow agitation by an agitator 22M so that flocs are grown, thereby obtaining excellent flocculated sludge. The flocculated sludge obtained is discharged through piping 26 and is transferred to the next process for dewatering treatment.

Though the temporary retention section consists of the retention tank 21 in the flocculation apparatus shown in FIGS. 4, 5a, and 5b, the temporary retention section may be a large-diameter piping section 27 as shown in FIG. 6.

In the flocculation reaction apparatus of this case, an inorganic coagulant injected at the joint between transfer piping 23 and small-diameter piping 24 is uniformly mixed with and diffused into sludge by turbulent flow in the small-diameter piping 24 in the same manner as the flocculation apparatus of FIGS. 4, 5a, and 5b. After that, the sludge flows from the small-diameter piping 24 into the large-diameter piping section 27, thereby further promoting the mixing and diffusion of the inorganic coagulant. The sludge flows through the large-diameter piping section 27 and the piping 25 and flows into the flocculation tank (not shown) where an amphoteric polymer flocculant is added so that flocs are grown large because of slow agitation in the flocculation tank in the same manner as the flocculation apparatus of FIGS. 4, 5a, and 5b. Thus, the flocculated flocs are grown large and excellent flocculated sludge is thus obtained.

Introduction piping is preferably connected tangentially to the cylindrical tank 22 as shown in FIGS. 1a, 1b Though the amphoteric polymer flocculant is directly injected into the tank 22 in the apparatus of FIG. 4, the introduction piping to the tank 22 may be provided with small-diameter piping and the amphoteric polymer may be injected to the small-diameter piping or the piping just before the small-diameter piping as shown in FIGS. 1a, 1b, and 1c. A temporary retention section for uniform diffusion of the amphoteric polymer flocculant may be provided upstream of the flocculation tank 22.

When the inorganic coagulant is added, as mentioned in the above, neutralization reaction by the inorganic coagulant progresses very rapidly and it is not necessary to neutralize the entire amount of charges of sludge surface so that it is enough to neutralize 50% of charges. The inorganic coagulant is uniformly mixed in the small-diameter piping and is then spouted into the temporary retention section so that it is further uniformly mixed and diffused. Therefore, very short time is enough for retention in the retention tank 21 shown in FIG. 5b or the large-diameter piping section 27 shown in FIG. 6 as the temporary retention section. The retention time is generally from 0.5 to 20 seconds, preferably from 1 to 10 seconds. Therefore, the temporary retention section is designed in such a manner as to ensure such retention time.

In the present invention, the diameter of the small-diameter piping is not limited but smaller than the diameter of the transfer piping upstream of the small-diameter piping. However, when the diameter of the small-diameter piping is too large, the mixing and uniform diffused function by the small-diameter piping can not be obtained enough. When the diameter of the small-diameter piping is too small, the pressure loss must be increased, and undesirable troubles such as blockage in piping would be occured. The diameter of the small-diameter piping is preferably set such that the flow velocity of spouted flow from the small-diameter piping into the inlet of the temporary retention section (hereinafter, referred to as "spouting velocity") becomes about 1 m to 10 m/sec, especially about 2 m to 5 m/sec. In normal cases, the diameter of the small-diameter piping is as follows. That is, as shown in FIG. 1c, the diameter of small-diameter portion 13B having a constant diameter of the small-diameter piping is preferably set to be ¼ to ½ of the diameter of the transfer piping 12.

The length of the small-diameter piping is preferably longer in view of obtaining the mixing and uniform diffusion function by turbulent-flow in the small-diameter piping. However, it is not preferable that the small-diameter-piping is too long, because pressure loss is increased, involving a necessity of increasing the discharge pressure of the transfer pump. Since well mixing and uniform diffusion effect is obtained by action of spouted flow at a portion from the small-diameter piping into the temporary retention section and action of mixing flow in the temporary retention section in addition to the mixing and uniform diffusion function by turbulent flow in the small-diameter piping in the present invention, it is not required to make the small-diameter piping too long. The length of the small-diameter piping in a range of from 0.1 m to 1.0 m is enough, but depending on the diameter and tapering degree of the small-diameter piping.

In this specification, the small-diameter piping designates a portion of which diameter is smaller than the transfer piping. That is, for example in FIG. 1c, the small-diameter piping 13 includes a tapering portion 13A of which diameter is gradually reducing from the transfer piping 12 and the small-diameter portion 13B of which diameter is constant. The length of the tapering portion 13A of the small-diameter piping 13 which extends from the transfer piping 12 is preferably about 5% to 50% of the entire length of the small-diameter piping 13.

A flocculant supplying device is disposed on the small-diameter piping or the transfer piping upstream of the same. The flocculent injected into suspension is preferably immediately subjected to strong agitation so that the flocculant is uniformly diffused. Therefore, the flocculant may be, for example in FIG. 1c, a proximal end portion B upstream of the small-diameter piping 13 (i.e. the joint between the small-diameter piping 13 and the transfer piping 12), a middle portion of the tapering portion 13A of the small-diameter piping 13, a boundary portion D between the tapering portion 13A and the constant small-diameter portion 13B of the small-diameter piping 13, a middle portion E of the constant small-diameter portion 13B of the small-diameter piping 13, or a portion A of the transfer piping 12 just before the small-diameter piping 13. Especially,-the flocculant is preferably injected at at least one of the portions A, B, C, and D of FIG. 1c. The flocculant may be injected with some pressure by an injection pump such as a variable injection pump into the piping through flocculant injection piping connected to the small-diameter piping or the transfer piping.

In the present invention, the large-diameter piping section, the retention tank, or the flocculation tank as the temporary retention section is required to have a cross-sectional area of flow path, which is larger than the cross-sectional area of the transfer piping, at at least a part thereof in a direction from the inlet toward the outlet. For example, the maximum diameter of the large-diameter piping portion shown in FIGS. 2a, 2b, FIG. 6 is preferably about two times to four times as large as the diameter of the transfer piping.

A device for mixing and uniformly diffusing a flocculant may be composed of a plurality of combinations of the small-diameter piping and the temporary retention section which are connected in series, thereby further reliably conducting the mixing and uniform diffusion of the flocculant. In some cases, a plurality of combinations may be connected in parallel.

In case of flocculation treatment of suspension such as sludge by the coagulation-flocculation apparatus of the present invention, the temporary retention section preferably has a closed vessel-like form. In this case, it is possible to prevent generation of odor, scattering of sludge, overflow of sludge while being transferred to the subsequent stage.

In FIGS. 1a through 6, the case of conducting flocculation treatment of sludge by the flocculation apparatus of the present invention is illustrated. The flocculation apparatus of the present invention is effective for flocculation treatment for suspension water of which concentration of suspended solids is high such as excess sludge discharged from biological treatment process. However, the flocculation apparatus of the present invention is not limited to be used for such high concentration suspension and can be suitably used for coagulation-flocculation treatment for waste water of which concentration of suspended solids is relatively low such as industrial wastewater and sewage water.

EXAMPLES AND COMPARATIVE EXAMPLES

Hereinafter, the present invention will be described concretely with reference to examples and comparative examples.

Examples 1, 2

Excess sludge (concentration of 2%) discharged from biological treatment process of sewage water was supplied at a rate of 3.5 m$^3$/hr into the flocculation reaction apparatus of the present invention shown in FIGS. 1a–c and was subjected to flocculation treatment.

The diameter of transfer piping 12, the diameter and the length of small-diameter piping 13, and the spouting velocity to a flocculation tank 11 were shown in Table 1. The dimensions of the tank 11 and the retention time were shown in Table 1.

"Kurifix CP604" available from Kurita Water Industries Ltd. was added as a polymer flocculant at an additive rate relative to TS of the sludge shown in Table 1 at the joint(portion B in FIG. 1c) between the small-diameter piping 13 and the transfer piping 12. The strength of flocs of flocculated sludge thus obtained was evaluated by the following criteria and the result is shown in Table 1.

Very good: allowed to be dewatered enough by a beltpress filter

Good: allowed to be dewatered by the beltpress filter

Not good: hardly dewatered by the beltpress filter.

Comparative Examples 1, 2

Figure 7A:
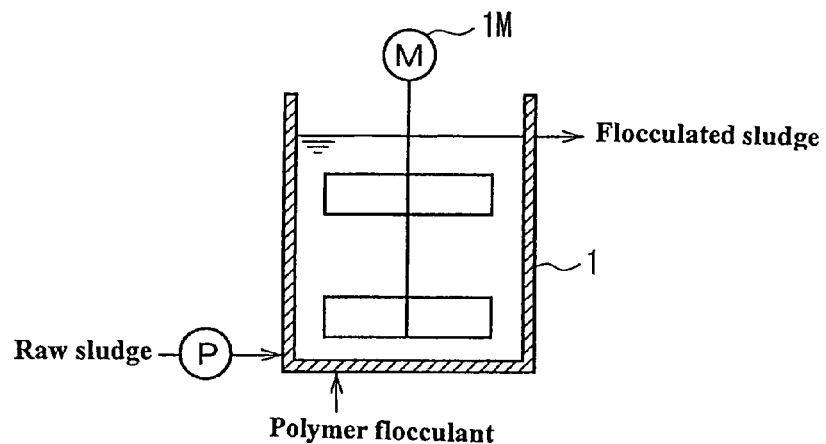
FIG. 7a and FIG. 7b are schematic sectional views showing conventional coagulation-flocculation apparatuses.

Flocculation treatment was conducted in the same manner as Examples 1, 2 except that a conventional flocculation reaction apparatus shown in FIG. 7a was used and the retention time in a flocculation reaction tank of which dimensions were shown in Table 1 was 3 minutes. The strength of flocs of the flocculated sludge thus obtained was evaluated in the same manner and the result is shown in Table 1.

TABLE 1

|  |  | Example | | Comparative Example | |
|---|---|---|---|---|---|
|  |  | 1 | 2 | 1 | 2 |
| Diameter of transfer piping (mm) | | 40 | | 40 | |
| Small-diameter | Diameter* (mm) | 40–20 | | — | |

TABLE 1-continued

|  |  | Example | | Comparative Example | |
|---|---|---|---|---|---|
|  |  | 1 | 2 | 1 | 2 |
| piping | Length (mm) | about 200 | — | | |
| Spouting flow velocity (m/sec) | | 3.1 | | 0.77 | |
| Flocculation tank | Dimension (mm) | ϕ400 × H800 | | ϕ500 × H1200 | |
|  | Effective capacity (L) | 58 | | 175 | |
|  | Retention time (min.) | 1 | | 3 | |
| Additive rate of polymer flocculant (%/TS) | | 1.0 | 1.2 | 1.0 | 1.2 |
| Strength of flocs | | Good | Very good | Not good | Good |

*A portion of which diameter is tapered from 40 mm to 20 mm along a length of 50 mm and a portion thereafter of which diameter is 20 mm along a length of 150 mm.

From Table 1, it was found that the flocculation apparatus of the present invention can obtain excellent flocculation effect with the flocculation tank of which capacity is about ⅓ of the conventional flocculation tank and allows reduction in required additive rate of polymer flocculant.

Examples 3, 4

Excess sludge (concentration of 2%) discharged from biological treatment process of sewage water was supplied at a rate of 3.5 m³/hr into the flocculation apparatus of the present invention shown in FIGS. 4, 5 and was subjected to flocculation treatment.

The diameter of transfer piping 23, the diameter and the length of small-diameter piping 24, and the spouting velocity to a retention tank 21 were as shown in Table 2. The dimensions of the retention tank 21 and the retention time were shown in Table 2. The dimensions of the flocculation tank 22 were ϕ400 mm×H800 mm (effective capacity of 58 L) and the retention time was 1 minute.

Polyferric sulphate was added as an inorganic coagulant at an additive rate relative to TS of sludge shown in Table 2 at the joint (portion B in FIG. 1c) between the small-diameter piping 24 and the transfer piping 23 and "Kuribest E802" available from Kurita Water Industries Ltd. was added as a polymer flocculant at 3.5% relative to TS of the sludge. The strength of flocs of flocculated sludge thus obtained was evaluated by the following criteria and the result is shown in Table 2.

Comparative Examples 3, 4

Figure 7B:
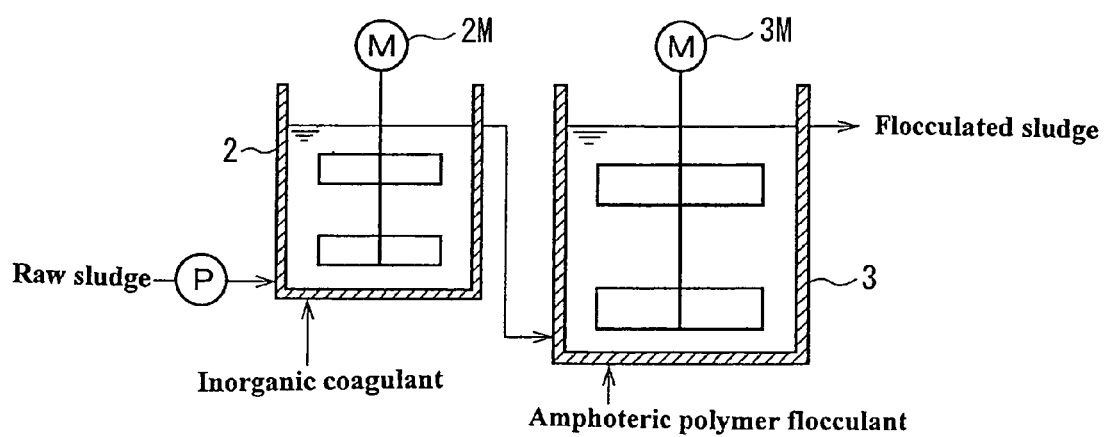

Flocculation treatment was conducted in the same manner as Examples 3, 4 except that a conventional flocculation apparatus shown in FIG. 7b was used and the retention time in a first reaction tank of which dimensions were shown in Table 2 was 339 seconds. The strength of flocs of the flocculated sludge thus obtained was evaluated in the same manner and the result is shown in Table 2.

TABLE 2

|  |  | Example | | Comparative Example | |
|---|---|---|---|---|---|
|  |  | 3 | 4 | 3 | 4 |
| Diameter of transfer piping (mm) | | 40 | | 40 | |
| Small-diameter piping | Diameter* (mm) | 40–20 | | — | |
|  | Length (mm) | about 200 | | — | |
| Spouting flow velocity (m/sec) | | 3.1 | | 0.77 | |
| Retention tank or First reaction tank | Dimension (mm) | ϕ150 × H400 | | ϕ600 × H1400 | |
|  | Effective capacity (L) | 7.1 | | 330 | |
|  | Retention time (min.) | 7 | | 339 | |
| Additive rate of inorganic coagulant (%/TS) | | 7.2 | 14.4 | 7.2 | 14.4 |
| Strength of flocs | | Good | Very good | Not good | Good or very good |

*A portion of which diameter is tapered from 40 mm to 20 mm along a length of 0 mm and a portion thereafter of which diameter is 20 mm along a length of 150 mm.

From Table 2, it was found that the flocculation apparatus of the present invention can obtain excellent flocculation effect with the retention tank of which capacity is about ¹⁄45 of the conventional first reaction tank, thereby allowing significant reduction in size of the apparatus.

As described in detail above, the following effects can be obtained by the flocculation apparatus of the present invention.

i) Uniform diffusion and mixing of flocculant into suspension water is achieved so as to exhibit flocculating function of the flocculant effectively.
ii) Therefore, the required additive rate of flocculant can be reduced.
iii) The time required to uniformly diffuse and mix the flocculant can be shortened so as to allow reduction in required capacity of the reaction tank, thereby allowing reduction in size of the apparatus and reduction in plant cost.
iv) All or some of mixers for mixing flocculant can be omitted so as to allow reduction in power required for agitation. The omission of mixers also eliminates troubles derived from mixers such as being clung thereto with foreign substances in suspension water. Excellent effects as mentioned above are exhibited so that coagulation-flocculation treatment of suspension water can be achieved by a small apparatus, with reduced cost and effectively.

What is claimed is:

1. A coagulation-flocculation apparatus comprising:
transfer piping for transferring suspension water;
small-diameter piping having a diameter smaller than that of the transfer piping;
a tapering section for connecting the transfer piping to the small-diameter piping;
a flocculant supplying device for injecting a flocculant at one of the tapering section, a middle portion of the small diameter piping, and a boundary between the tapering section and the small diameter piping; and
a temporary retention section for flocculation having an inlet and an outlet for water, said small-diameter piping being connected to the inlet, wherein a cross-sectional area of a flow path at at least a part of the temporary retention section in the direction from the inlet toward the outlet is larger than the cross-sectional area of said transfer piping.

2. A coagulation-flocculation apparatus as claimed in claim 1, wherein said temporary retention section comprises piping having a diameter larger than that of the transfer piping.

3. A coagulation flocculation apparatus as claimed in claim 1, wherein said temporary retention section comprises a cylindrical vessel and said small-diameter piping is connected substantially tangentially to the cylindrical vessel so as to generate circling flow in the cylindrical vessel.

4. A coagulation-flocculation apparatus as claimed in claim 3, wherein said temporary retention section is provided with an agitator.

5. A coagulation-flocculation apparatus as claimed in claim 1, wherein an agitation reaction tank having an agitator is arranged downstream of the temporary retention section.

6. A coagulation-flocculation apparatus as claimed in claim 1, wherein said flocculant supply device supplies an inorganic coagulant.

7. A coagulation-flocculation apparatus as claimed in claim 1, wherein said flocculant supply device supplies a polymer flocculant.

8. A coagulation-flocculation apparatus as claimed in claim 1, wherein said small diameter piping has a diameter between ¼ and ½ of a diameter of the transfer piping.

* * * * *